(12) United States Patent
Fang

(10) Patent No.: US 8,578,750 B2
(45) Date of Patent: Nov. 12, 2013

(54) METHOD AND TOOL FOR HOT FORMING A METAL WORKPIECE

(75) Inventor: Xiangfan Fang, Cologne (DE)

(73) Assignee: Magna Automotive Services GmbH, Sailauf (DE)

( * ) Notice: Subject to any disclaimer, the term of this patent is extended or adjusted under 35 U.S.C. 154(b) by 594 days.

(21) Appl. No.: 12/439,382

(22) PCT Filed: May 9, 2007

(86) PCT No.: PCT/EP2007/004111
§ 371 (c)(1),
(2), (4) Date: Dec. 16, 2009

(87) PCT Pub. No.: WO2008/025387
PCT Pub. Date: Mar. 6, 2008

(65) Prior Publication Data
US 2010/0126640 A1    May 27, 2010

(30) Foreign Application Priority Data
Aug. 28, 2006  (DE) .................. 10 2006 040 224

(51) Int. Cl.
*B21D 37/16*  (2006.01)
*B21D 43/28*  (2006.01)
(52) U.S. Cl.
USPC .............. 72/342.4; 72/342.5; 72/338; 72/294
(58) Field of Classification Search
USPC ........ 72/324, 328, 343, 344, 352, 353.2, 356, 72/360, 294, 342.1–342.5, 342.7, 357, 338
See application file for complete search history.

(56) References Cited

U.S. PATENT DOCUMENTS

| | | | | | |
|---|---|---|---|---|---|
| 2,270,187 | A | * | 1/1942 | Dulmage | 72/350 |
| 3,537,291 | A | * | 11/1970 | Hawkins | 72/352 |
| 3,768,295 | A | * | 10/1973 | Cudzik | 72/347 |
| 3,990,142 | A | * | 11/1976 | Weglin | 29/848 |
| 5,172,780 | A | * | 12/1992 | Batliner et al. | 175/435 |

(Continued)

FOREIGN PATENT DOCUMENTS

| | | |
|---|---|---|
| DE | 102004019693 A1 | 11/2005 |
| JP | 2005248253 A | 9/2005 |
| WO | 9926740 A | 6/1999 |
| WO | 2007084089 A | 7/2007 |

OTHER PUBLICATIONS

Machine translation of JP 2005248253, 2005.*

*Primary Examiner* — Dana Ross
*Assistant Examiner* — Pradeep C Battula
(74) *Attorney, Agent, or Firm* — Dickinson Wright PLLC

(57) ABSTRACT

The invention relates to a hot forming tool (1, 101, 201, 301) for hot forming a metal workpiece (4, 204), having at least two dies (2, 3; 202, 203; 202, 303) which may be moved relative to one another for forming the workpiece (4, 204), and having a cooling device (5) by means of which the workpiece (4, 204) may be cooled in the hot forming tool (1, 101, 201, 301) from a first, higher temperature to a second, lower temperature. To improve the hot forming tool (1, 101, 201, 301), it is provided that the hot forming tool (1, 101, 201, 301) is equipped with a separating device (10, 210, 310) by means of which a separating operation may be carried out on a workpiece (4, 204) present in the hot forming tool (1, 101, 201, 301). The invention further relates to a method for hot forming.

35 Claims, 4 Drawing Sheets

(56) References Cited

U.S. PATENT DOCUMENTS

| | | | |
|---|---|---|---|
| 6,397,651 B2 * | 6/2002 | Usui et al. | 72/335 |
| 6,543,268 B2 * | 4/2003 | Wright et al. | 72/379.4 |
| 6,742,374 B2 * | 6/2004 | Ozawa | 72/342.5 |
| 8,047,037 B2 * | 11/2011 | Vehof et al. | 72/60 |
| 8,291,741 B2 * | 10/2012 | Domange et al. | 72/342.5 |
| 2002/0113041 A1 | 8/2002 | Ozawa | |
| 2008/0148799 A1 * | 6/2008 | Kimura et al. | 72/324 |
| 2008/0295563 A1 * | 12/2008 | Terziakin | 72/364 |
| 2010/0018277 A1 * | 1/2010 | Hielscher | 72/352 |
| 2010/0064759 A1 * | 3/2010 | Kondo et al. | 72/342.3 |
| 2012/0067098 A1 * | 3/2012 | Chien | 72/343 |
| 2012/0090371 A1 * | 4/2012 | Radlmayr et al. | 72/342.7 |
| 2012/0279273 A1 * | 11/2012 | Tsuchiya et al. | 72/352 |

* cited by examiner

METHOD AND TOOL FOR HOT FORMING A METAL WORKPIECE

CROSS-REFERENCE TO RELATED APPLICATIONS

This application claims priority from German Patent Application Serial No. 10 2006 040 224.3 filed on Aug. 28, 2006, entitled "Verfahren and Werkzeug zum Warmumformen eines Metallwerkstücks" (Method And Tool For Hot Forming A Metal Workpiece), which is incorporated herein by reference for all purposes.

FIELD OF THE INVENTION

The present invention relates to a method and a tool for hot forming of metal work pieces.

BACKGROUND OF THE INVENTION

For such a known generic forming tool, a metal workpiece heated to the austenitizing temperature is formed. The forming tool has a cooling device by means of which the workpiece present in the forming tool is quenched in order to convert the austenitic structure to a martensitic structure, i.e., to harden the workpiece. In this regard it is important to maintain a specific variation of the temperature of the workpiece over time to achieve the desired hardness and type of martensitic structure. In particular, a minimum cooling rate is necessary. On the other hand, the cooling must be coordinated with the forming. If the workpiece hardens too soon, the forming is adversely affected.

The workpiece is held in the forming tool until it has cooled to a temperature of approximately 100° C. This ensures that the workpiece has sufficiently cooled and has dimensions that essentially correspond to its final dimensions.

The workpiece is then delivered to further machining steps in which its outer contour is trimmed, for example using a laser or plasma cutting unit.

JP 2005-248253 A relates to a method for hot forming of steel material. The steel material is heated and positioned between an upper die and a lower die. The hot forming is then performed. The closed dies together with the workpiece present therein are moved downward relative to a punch and a trimming edge in order to punch the workpiece and trim its edge. The punch cooperates with a punch recess in the upper die, and the trimming edge cooperates with a side edge of said die. The punch and the trimming edge are fixed to a stationary platform.

US 2002/0113041 A1 discloses various forming devices. One of these forming devices also has a punching die which is provided in an upper die and cooperates with a corresponding recess in a lower die. A workpiece is placed between the opened dies. The dies are then brought together, thereby forming the workpiece. When the dies are completely brought together they securely hold the workpiece in position, thus allowing punching to be carried out using the punching die.

WO 99/26740 relates to fine-edge blanking of a semihot formed workpiece. In a first process area punching material is provided, in a second process area is preheated, and in a third process area is heated to a semihot forming temperature and is formed. Fine-edge blanking of the completely formed part is carried out in a fourth process area.

DE 10 2004 019 693 A1 relates to a method in which a workpiece is heated to a temperature of approximately 950° C., and is then hot formed using a first and a second die. After the dies are closed, the workpiece remains for a period of time between the closed dies in order to cool. During the holding period the workpiece is punched, using a punch provided in the lower die.

SUMMARY OF THE INVENTION

The invention relates to a method for hot forming a metal workpiece, in which the workpiece is first formed in a forming tool at a first, higher temperature, and reaches a second, lower temperature at which the material of the workpiece has a much higher strength than at the first temperature. The invention further relates to a forming tool for this purpose.

The object of the present invention is to improve a method for hot forming of a metal workpiece in such a way that the workpiece is formed in the simplest manner possible and undergoes a separating operation, and to provide a corresponding device for this purpose.

The object is achieved according to the invention by use of a method for hot forming of a metal workpiece, having the features of claim 1.

This enables the separating operation to be performed directly on the workpiece in the forming tool. It is even possible to provide good coordination of the forming and the separating operation as a function of time, also taking the cooling into consideration. The integrated method of forming and separation also allows high production accuracy to be achieved.

Because the separating operation is carried out before the workpiece reaches the second temperature, mechanical separating agents may also be satisfactorily used. Before it reaches the second temperature the workpiece still has a much lower strength; i.e., the wear on mechanical separating agents is low.

Separation may be carried out by means of a relative motion between a workpiece holder and a die for the hot forming tool. The separating operation may advantageously be performed using the workpiece holder.

Alternatively or additionally, separation may be performed directly by bringing together two dies for the forming tool. In this manner separation and forming are carried out in a single integrated operation as a result of bringing the dies together.

The structure of the workpiece may advantageously be converted during the transition from the first to the second temperature. The structural conversion allows the higher strength to be achieved in a particularly satisfactory manner.

The structure may preferably be converted from an austinitic to a martensitic structure. In this manner hardening of the workpiece is integrated into the method.

The separation may advantageously be completed before the structure has been converted. The separating operation may thus be carried out before complete structural conversion has taken place, and the workpiece, which is still fairly soft, may be separated with low wear.

The separation may be carried out in a particularly advantageous manner in a temperature range of approximately 350° C. to 500° C. In this temperature range the workpiece is still sufficiently soft. Mechanical separating agents may be used in this temperature range with a good service life.

Separation may preferably be carried out directly after the forming is completed. This results in high accuracy, since the forming no longer alters the geometry of the workpiece.

Separation may particularly preferably be carried out toward the end of the forming operation. At this point the workpiece is sufficiently formed, so that high accuracy may still be achieved when separation is performed.

The separation may particularly preferably be performed for a residual path of dies for the forming tool of approximately one to three times the material thickness of the workpiece, preferably for a residual path of approximately twice the material thickness of the workpiece. This achieves high accuracy for a separation carried out toward the end of the forming operation.

In a particularly advantageously manner, after separation a region of the workpiece adjacent to the separation point may be displaced in the direction of the region of the dies for the forming tool. The intended final contour is thus achieved by moving the workpiece into the region of the dies.

The workpiece holder may advantageously be moved relative to a first die, which before the separation essentially maintains its relative position with respect to the workpiece holder. In this manner the die and the workpiece holder are essentially able to maintain their position relative to one another, and during separation the separating operation occurs as a result of the relative motion.

The workpiece holder may particularly preferably be moved relative to the first die after the first die has completed its motion relative to a second die. Thus, for example, the workpiece holder could continue to move after the first die has met the second die, thus carrying out the separating operation.

The first die may preferably be moved relative to the workpiece holder after the workpiece holder has completed its motion relative to a second die. For example, the first die could continue moving toward the second die after the relative motion of the workpiece holder with respect to the second die has been stopped, thus carrying out the separating operation.

The dies may advantageously have cutting elements for a separating device, which during the separation are held in their relative position with respect to the shaping contour of the respective die. Thus, the integrated separation and forming operation is possible by means of a mechanically simple motion of the dies, which perform the separation with the assistance of their cutting elements.

In one refinement of the invention, during the separation a first molded part of a die may be moved relative to a second molded part of said die. Thus, the separating operation may be carried out by means of a relative motion of the molded parts. In one particular design, a region of the workpiece associated with one of the molded parts may be completely formed before the separation. High accuracy during separation may be achieved in this manner.

The separating operation may be performed in a particularly advantageous manner using at least one separating device, which immediately after the separation is moved back to its position before the separation. This keeps the duration of contact of the separating device with the separating plane of the workpiece low, thereby limiting the heating of the separating device. Not only is the wear caused by heating or thermal expansion of the separating device reduced, but also jamming of the separating device and workpiece is counteracted.

The separating operation may be used in a particularly advantageous manner to produce an edge contour on the workpiece. A projecting length remaining from the forming may thus be removed.

The workpiece is preferably punched in the hot forming tool. In this manner a closed workpiece region is separated from the workpiece.

Punching is advantageously carried out only after the workpiece has been formed. High accuracy of the punched contour is thus achieved.

The object of the invention is further achieved by use of a hot forming tool for hot forming of a metal workpiece, having the features of Claim 19.

It is thus possible to provide the hot forming tool with a separating device, by means of which a separating operation may be carried out directly on the workpiece present in the hot forming tool. By using such a separating device it is even possible to provide good coordination of the forming and the separating operation as a function of time, also taking cooling into consideration. In addition, high production accuracy may be achieved by using the hot forming tool provided with the separating device.

At least a portion of the separating device may be provided with a workpiece holder which secures the workpiece during forming and is able to move relative to a die, thus allowing a separating operation to be carried out by means of this relative motion. The separating operation may thus be advantageously performed with the assistance of the workpiece holder.

Alternatively or additionally, the separating device may have mutually associated cutting elements provided on the dies which perform a separating operation on the workpiece when the dies are brought together. In this manner forming and separation are carried out in a single integrated operation as a result of the dies coming together.

The workpiece holder may particularly preferably be movable relative to a first die which essentially maintains its relative position with respect to the workpiece holder until separation is achieved. In this manner the die and the workpiece holder are essentially able to maintain their relative position, and during separation the separating operation occurs as a result of the relative motion.

The workpiece holder may advantageously be movable relative to a second die over a dead center point of the dies in the closed state. The separating operation may be carried out, for example, by the workpiece holder continuing its motion relative to the second die while the first die no longer moves relative to the second die.

The first die may advantageously be movable relative to a second die over a dead center point of the workpiece holder with respect to the second die. Thus, the first die, for example, could continue its motion relative to the second die while the workpiece holder rested with respect to the second die, thus carrying out the separating operation.

Preferably, at least one cutting element may be provided on the workpiece holder, and at least one cutting element for the separating device may be provided on the die. Thus, a separating operation may be carried out by means of a relative motion of the die and the workpiece holder.

The separating device may advantageously have a punching tool which is connected to the workpiece holder and is able to move with same. Moving the workpiece holder causes the punching tool to be moved, thus allowing a separating operation to be performed. It is possible to carry out simultaneous separating operations with the assistance of the motion of the punching tool and the workpiece holder.

The cutting elements may advantageously be fixed in position with respect to the shaping contour of their respective dies. It is thus possible to carry out forming and separation by means of a mechanically simple motion of the dies, which achieve the separation with assistance from the cutting elements.

In one refinement of the invention, a die may have a first molded part, as well as a second molded part which during the separation may be moved relative to the first molded part. A region of the workpiece associated with one of the molded parts may be completely formed before the separation. High separation accuracy may be achieved in this manner.

It is particularly advantageous for the separating device to have a punching tool. In this manner a closed workpiece region may be separated from the workpiece.

The separating device may advantageously have at least one cutting element which contains a Cu—Zr alloy. This imparts high heat strength to the cutting element, resulting in good wear resistance. In addition, the cutting element has good thermal conductivity. This opens the possibility for carrying out separation also at temperatures of approximately 500° C. to 350° C., for example, with indirect cooling of the cutting element.

BRIEF DESCRIPTION OF THE DRAWINGS

Exemplary embodiments of the invention will now be described in conjunction with the following drawings wherein like numerals represent like elements, and wherein.

DETAILED DESCRIPTION OF THE PREFERRED EMBODIMENTS

Figure 1:
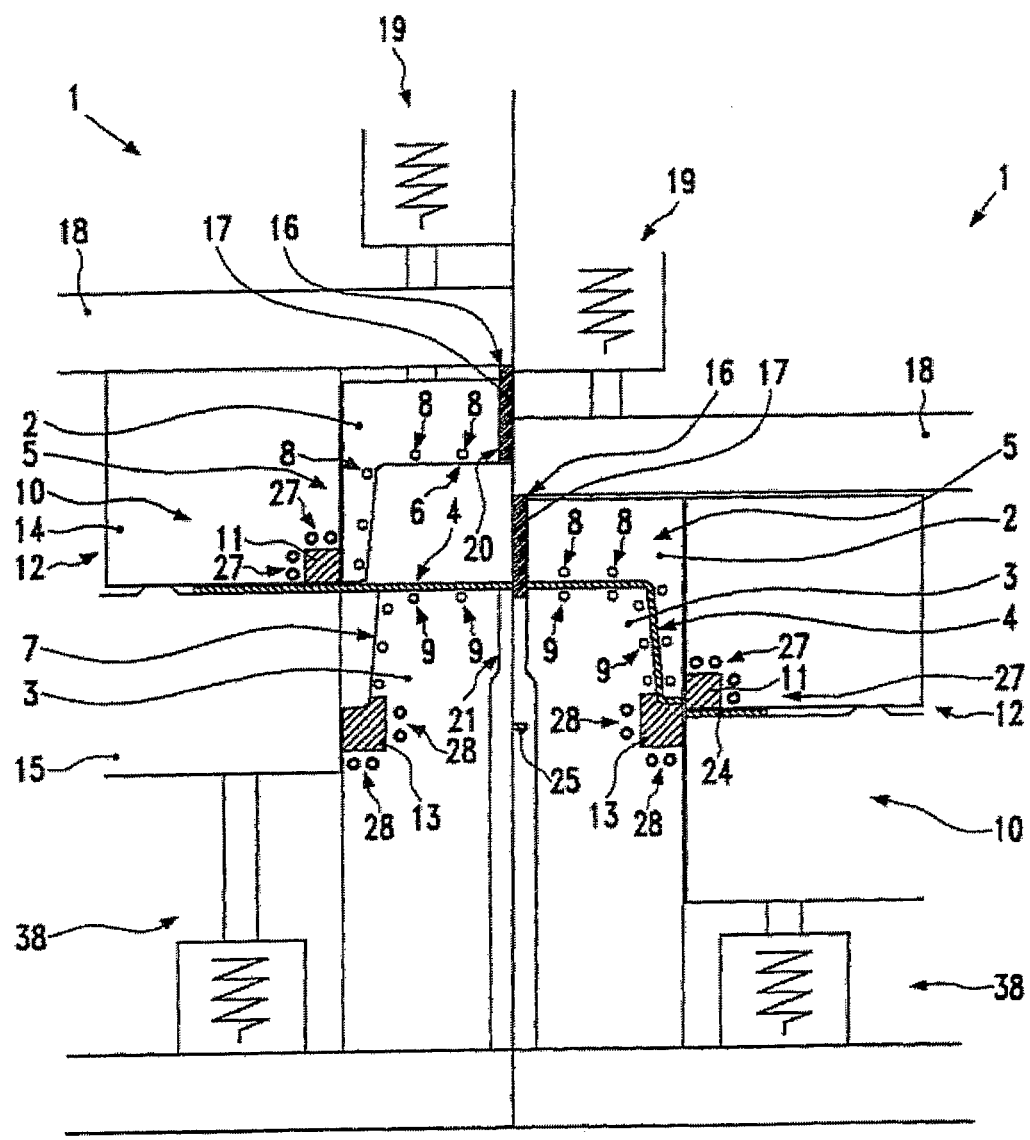
FIG. 1 shows a hot forming tool according to a first embodiment of the invention.

In the following description, the same reference numerals are used for identical or analogous elements.

The left half of each figure shows a position before the forming, and the right half of the figure shows a position after forming and separation.

In the following description, the term "forming" is understood to mean an alteration of the shape of a workpiece under the influence of a deforming tool.

FIG. 1 shows a hot forming tool 1 in a first embodiment of the invention, having two dies 2, 3 which may be moved relative to one another for forming a metal workpiece 4, a cooling device 5, a separating device 10, and a workpiece holder 12.

By use of the cooling device 5, the metal workpiece 4 in the hot forming tool 1 may be cooled from a first, higher temperature to a second, lower temperature. The cooling device 5 has cooling lines 8, 9 provided in the region of shaping surfaces 6, 7 of the dies 2, 3, and has cooling lines 27, 28 provided in the region of the separating device 10 and the workpiece holder 12, through which a coolant is conducted.

Using the separating device 10, a separating operation may be carried out on the metal workpiece 4 present in the hot forming tool 1. A portion of the separating device 10 is provided with one of the dies, and is indirectly cooled by the cooling lines 27 provided in this region. Another portion of the separating device 10 is provided with the workpiece holder 12, which secures the metal workpiece during the forming and is able to move relative to the die, and is indirectly cooled by the cooling lines 28 provided in this region.

At least a portion of the separating device may also be provided for direct cooling using cooling lines.

The workpiece holder 12 in particular has a first holding part 14 and a second holding part 15, between which the metal workpiece 4 is held. In the present embodiment of the invention, the first holding part 14 is provided with a first cutting element 11 of the separating device 10 and is located next to the first die 2, the workpiece holder 12 being movable relative to the first die.

The second die 3 is provided with a second cutting element 13 of the separating device 10, which corresponds to the first cutting element 11 and cooperates with same during the separation. The first cutting element 11 is a part of the shaping surface of its die. In the starting position before the forming, as shown in the left half of FIG. 1, the first and second cutting elements are located on opposite sides of the metal workpiece 4.

The separating device 10 also has a punching tool 16 having a third cutting element 17. The punching tool 16 is connected to the workpiece holder 12 and is able to move with same. The workpiece holder 12 and the punching tool 16 are mounted on a shared base plate 18. The base plate 18 spans the region of the dies. The first holding part 14 rests against the base plate.

When the base plate 18 moves relative to the first die 2, this causes the first holding part 14 and the punching tool 16 to move relative to the first die 2. The relative movability of the base plate 18 with respect to the first die 2 is made possible by a die cushion 19. The die cushion 19 may have spring elements and/or fluidic elements, for example hydraulic cylinders.

At least one of the cutting elements, in the present embodiment of the invention all of the cutting elements 11, 13, 17, contain an alloy which is highly heat-resistant and at the same time has good thermal conductivity. As a result, the cutting element experiences low wear, even at high temperatures, and is able to quickly dissipate absorbed heat. Thus, the cutting element may be sufficiently cooled by indirect cooling. However, the cutting element may also be actively cooled, for example by incorporating cooling channels and conducting coolant.

The cutting element preferably contains a Cu—Zr alloy.

The function of the hot forming tool 1 in the first embodiment of the invention is described below.

The metal workpiece 4 is heated to its first temperature, at which it has reduced strength and increased forming capability. In the present embodiment of the invention, the first temperature is an austenitizing temperature. This temperature may be selected, for example, in a range from 900° C. to 950° C.; the metal workpiece may be a boron alloy steel. The workpiece may be annealed for a certain period at the first temperature.

The workpiece is then positioned between the cold and actively cooled dies 2, 3, and is clamped between the holding parts 14, 15 of the workpiece holder 12. The second holding part 15 is opened and closed by an actuator 38 which may be operated hydraulically and/or by elastic force. The workpiece holder assumes the complete holding function for the workpiece.

Bringing together the dies 2, 3 causes the workpiece to be formed, which in the present case is a deep-drawing operation. The base plate 18—together with the workpiece holder 12 and the punching tool 16—maintains its relative position with respect to the first die 2 until the meeting of the dies has reached a dead center point, i.e., the dies 2, 3 are in the closed state. The forming of the workpiece 4 is complete when the dead center point has been reached.

The base plate 18 is then moved relative to the first die 2 in the direction of the second die, i.e., toward the workpiece 4. This causes the workpiece holder 12 to move relative to the first die, and as a result of this relative motion the first and second cutting elements 11, 13 perform a separating operation, by means of which an edge region 24 of the workpiece 4 is separated. At the same time, the punching tool 16 is moved relative to the first die 2, namely, through an opening 20 in the first die 2, until it passes into a corresponding counteropening 21 in the second die 3. As a result, a punched piece 25 is separated from the metal workpiece and is removed through the counteropening 21.

High accuracy in the separation is achieved by separation after the forming is completed.

The forming and separation are performed continuously. In particular, the separation is essentially completed before the workpiece reaches a second, lower temperature at which its material has a much higher strength than at the first temperature. In the present embodiment of the invention, the second temperature is a martensitic temperature. The metal workpiece is quenched by the cooling device 5 in the hot forming tool, thereby converting its austenitic structure to a martensitic structure during the transition from the first to the second temperature. The separation may be carried out, for example, in a temperature range of the workpiece 4 of approximately 500° C. to 350° C.

The right half of FIG. 1 shows the state of the hot forming tool 1 directly after the separation. Immediately afterwards, the base plate 18 is pulled back relative to the first die 2 along the cutting path, returning to its position before the separation. This causes the first and third cutting elements 11, 16 to be brought out of contact with the respective separating planes of the workpiece, and the introduction of heat from the separating planes is ended. The thermal expansion of the workpiece 4 is decoupled in particular from the cutting element 16, thus counteracting jamming.

The workpiece remains for a period of time in the hot forming tool until it has reached a temperature of approximately 100° C. to 150° C. The workpiece 4 continues to be held under pressure between the first die 2 and the second die 3.

The thermal shrinkage of the workpiece between the time of separation and the removal from the hot forming tool must be taken into account in the dimensioning of the forming tool. Since the dies remain closed until the workpiece is removed, the trimmed edge of the workpiece migrates inward along the cross section of the workpiece. This migration may be several millimeters, depending on the geometry of the parts. For this reason, the dies 2, 3 must have a fairly large design to take into account migration of the trimmed edges of the workpiece. That is to say, the workpiece achieves its final dimensions essentially when it reaches its intended removal temperature.

The cycle time for forming with separation is essentially the same as the cycle time for forming without separation.

Despite the trimming performed in the forming tool, the trimmed edge of the workpiece is just as satisfactory as a cut edge obtained by separation using a trimming unit that is separate from the hot forming tool.

Figure 2:
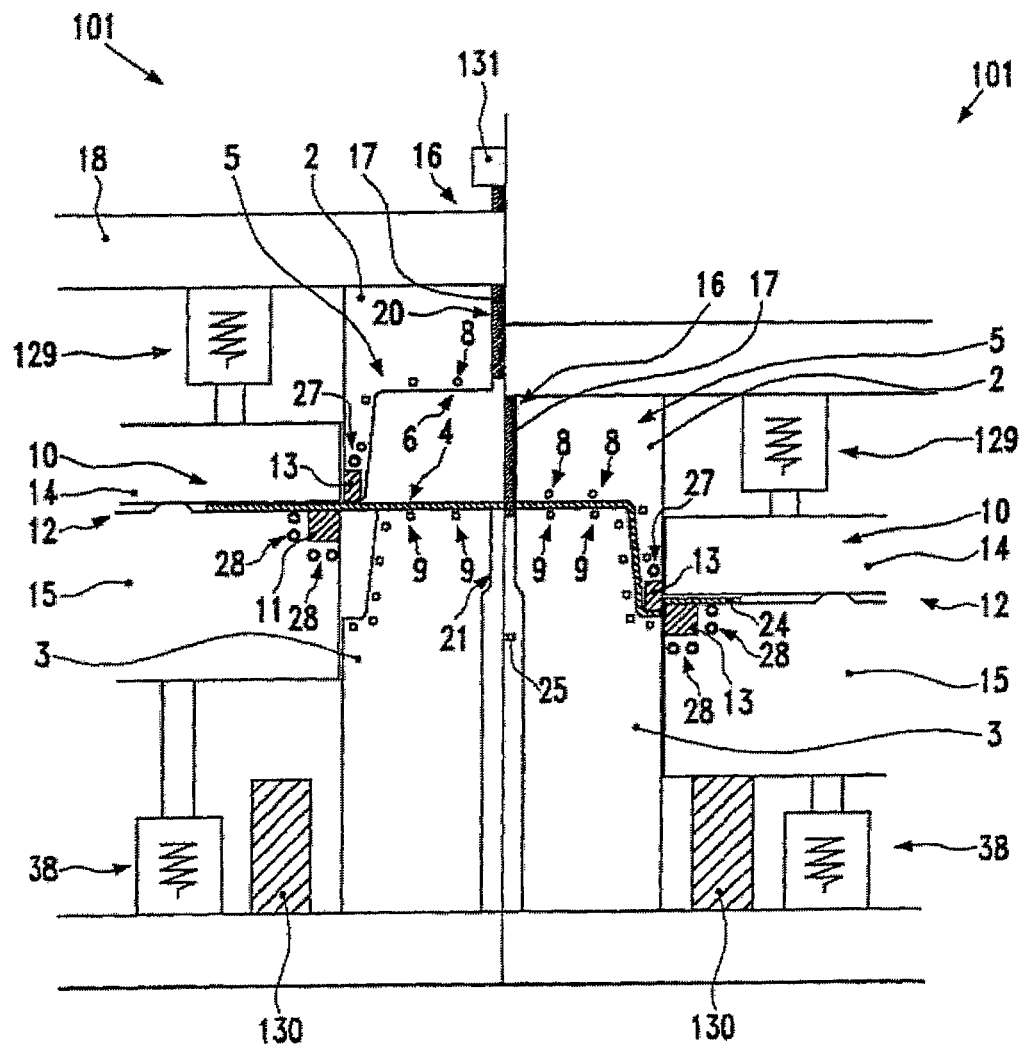
FIG. 2 shows a hot forming tool according to a second embodiment of the invention.

FIG. 2 shows a hot forming tool 101 in a second embodiment of the invention. The differences of the second embodiment of the invention with respect to the first embodiment of the invention are described below.

In contrast to the first embodiment of the invention, in the second embodiment the workpiece holder 12 for the hot forming tool 101 is moved relative to the first die 2 toward the end of the forming operation, i.e., before the forming is completed. Thus, separation is carried out toward the end of the forming operation. The relative motion, i.e., the separation, occurs for a residual path of the meeting dies which is approximately two to three times the material thickness of the metal workpiece 4, preferably for a residual path of approximately the material thickness of the metal workpiece plus approximately 1 mm. After the separation, a region of the workpiece adjacent to the separation point is displaced farther in the direction of the region of the dies. However, high accuracy is still achieved for the separation.

As a result of starting the separation earlier, not only is the forming and separation process completed sooner, but also the workpiece is hotter at the time of separation. On the other hand, separation may also be carried out when the metal workpiece has already reached its second temperature upon completion of the forming.

In the present embodiment of the invention, the preferred relative motion of the workpiece holder 12 with respect to the first die 2 occurs with the assistance of a stop device 130 and a motion buffer 129 between the base plate 18 and the workpiece holder 12, i.e., between the first die 2 and the workpiece holder 12. The motion buffer 129 may be operated hydraulically and/or by elastic force.

When the dies are brought together, the workpiece holder 12 and the first die 2 initially maintain their relative position. Toward the end of the forming, with assistance from a stop device 130 the workpiece holder 12, previously moved together with the first die 2, is prevented from further motion relative to the second die 3, i.e., reaches a dead center point with respect to the second die 3. With yielding of the motion buffer 129, the first die undergoes further motion relative to the second die until a shared dead center point is reached; i.e., the dies have come together and the workpiece is completely formed.

In contrast to the first embodiment of the invention, in the second embodiment of the invention the first cutting element 11 is provided on the second holding part 15, and the second cutting element 13 corresponding thereto is provided on the first die 2. As shown in FIG. 2, the cooling lines 27, 28 are correspondingly positioned.

A further difference from the first invention lies in the fact that the punching tool 16 is no longer provided directly on the base plate 18; instead, with assistance from a separate actuator 131 the punching tool is supported on the base plate so as to be movable relative thereto. This allows separation using the punching tool 16 to be carried out independently from a separation using the workpiece holder 12. This may also occur at a different time than the separation using the workpiece holder 12, for example as in the first embodiment after the forming is completely ended.

Figure 3:
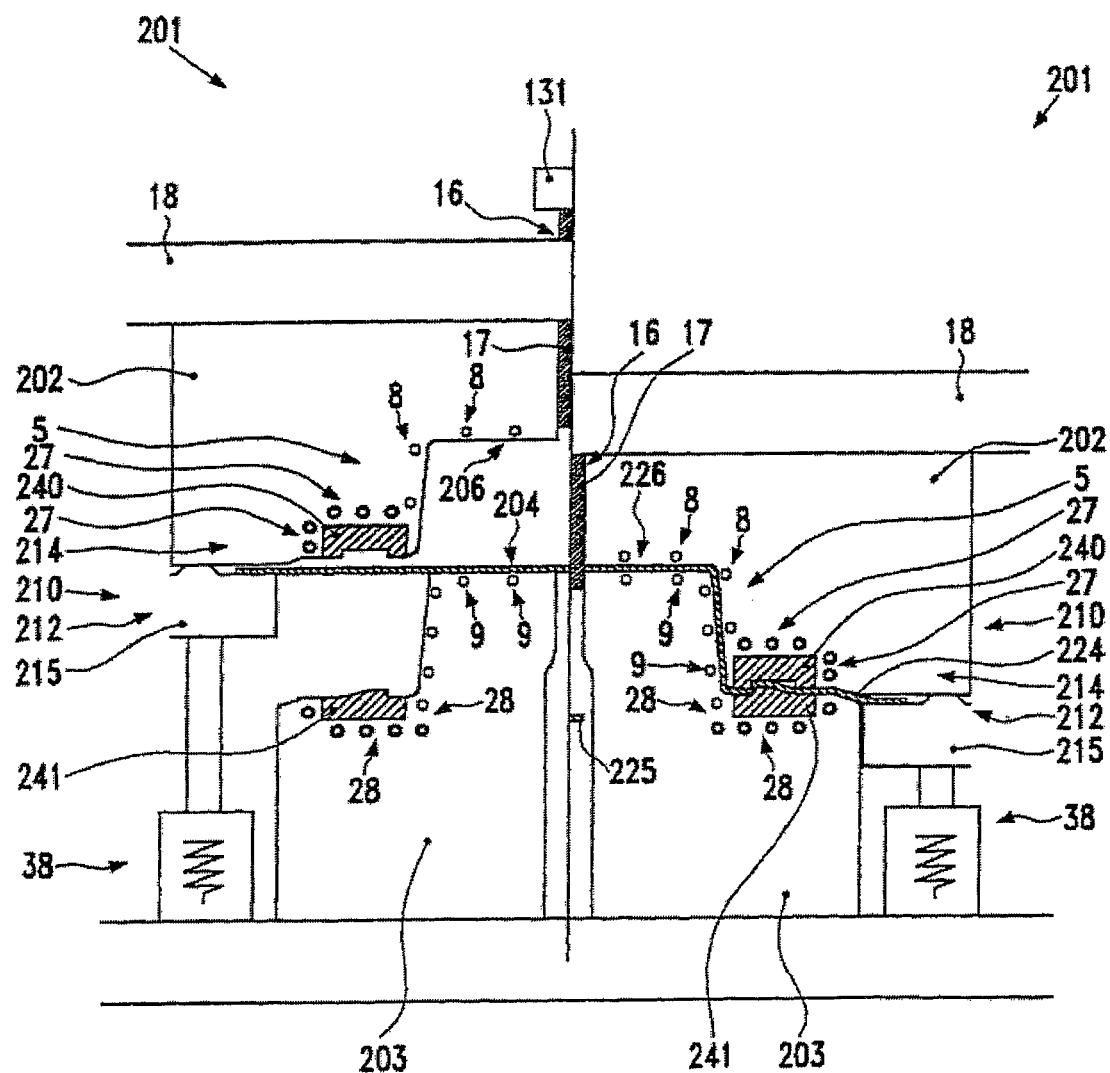
FIG. 3 shows a hot forming tool according to a third embodiment of the invention.

FIG. 3 shows a hot forming tool 201 in a third embodiment of the invention. The differences of the third embodiment of the invention with respect to the first and second embodiments are described below.

In the third embodiment of the invention, the separating device 210 has mutually associated first and second cutting elements 240, 241, provided directly on the dies 202, 203, which directly carry out a separating operation on the workpiece 204 as a result of the dies coming together. The cutting elements 240, 241 maintain their relative position with respect to their respective dies 202, 203.

However, the cutting elements may still have movable parts.

As shown in FIG. 3, the cooling lines 27, 28 are correspondingly provided in the region of the cutting elements 240, 241. Direct cooling is also possible.

The separation using the first and second cutting elements 240, 241 is started the same way as in the second embodiment of the invention, toward the end of the forming operation for a residual path of the dies, as previously described.

In the third embodiment of the invention, the first and second cutting elements 240, 241 are each situated in the middle of the shaping surfaces 206, 207 of the respective dies 202, 203. That is, after separation begins the edge region 224 of the workpiece 204 is also formed.

Using the first and second cutting elements 240, 241, separation may be carried out on the workpiece 204 in places, the edge region 224 remaining at the inner region 226 of the workpiece. However, the edge region 224 may also be completely separated from the inner region 226.

In the third embodiment of the invention, the hot forming tool 201 has a workpiece holder 212, the first holding part 214 of which is provided with the first die 202. The second holding part 215 of the workpiece holder is movable relative to the first die 202, the same as for the first and second embodiments.

The workpiece holder has a partial holding function for the workpiece. Before the forming, there is a space between the first cutting element 240 and the workpiece 204 held by the workpiece holder 212.

For the hot forming tool 201 in the third embodiment of the invention, the punching tool 16 is provided in the same manner as for the second embodiment of the invention.

The fourth embodiment of the invention is described below with reference to FIG. 4.

The fourth embodiment of the invention is a refinement of the third embodiment of the invention. The hot forming tool 301 has a second die which is divided into, a first molded part 350 and a second molded part 351. The two molded parts 350, 351 are moved relative to one another during the separation. This relative movability is made possible by a die cushion 360 which is provided so as to connect the molded parts.

For forming of the metal workpiece 204, the two dies 202, 303 move toward one another. First, the forming is completed between the first die and one of the molded parts 350. After reaching the dead center point of its relative motion, the first die 202 and this molded part move together relative to the second molded part 351, thus carrying out the separating operation. This procedure has the advantage that high accuracy is achieved for the separation by means of the relative movability of the two molded parts, the workpiece as a whole being completely formed when the separation begins.

In the fourth embodiment of the invention, the first die 202 travels together with the first, inner molded part 350 until the shared dead center point is reached. The second, outer molded part 351 has a second cutting element 341 which corresponds to the first cutting element 240 of the first die. This second cutting element performs the separation when the first die 202 and the first molded part 350 move together relative to the second molded part 351.

Figure 4:
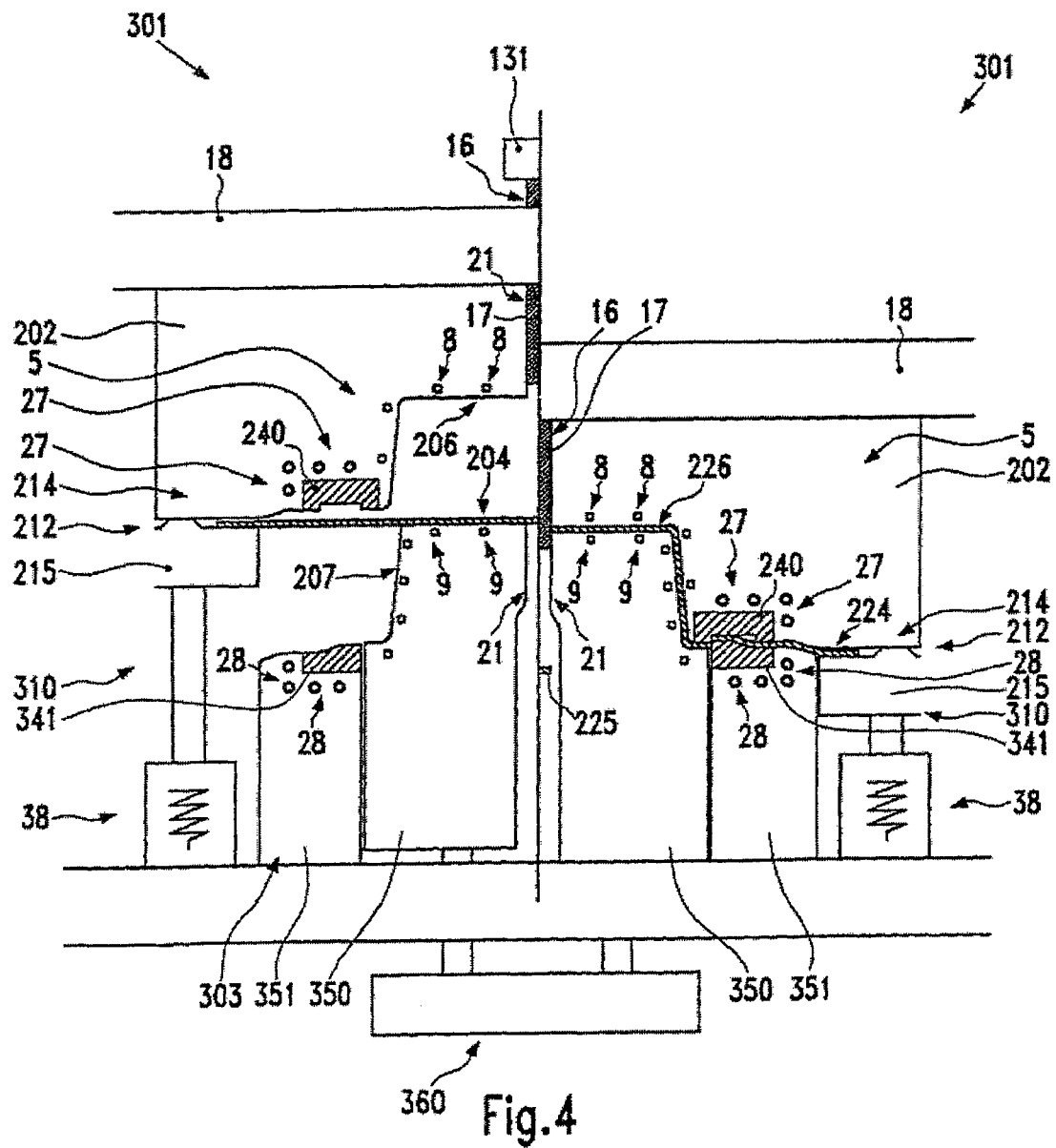
FIG. 4 shows a hot forming tool according to a fourth embodiment of the invention.

At least one of the cutting elements, in the present case the first cutting element 240, may have a holding function, in particular during the separation, as shown in FIG. 4. This cutting element presses the workpiece 204 against the inner molded part 350.

What is claimed is:

1. A hot forming tool for hot forming a metal workpiece, comprising at least two dies which may be moved relative to one another for forming the workpiece, and having a cooling device by means of which the workpiece may be cooled in the hot forming tool from a first, higher temperature to a second, lower temperature, whereby the hot forming tool is provided with a separating device by means of which a separation can be carried out on a workpiece present in the hot forming tool before the workpiece reaches the second, lower temperature, wherein at least a portion of the separating device is provided with a workpiece holder which holds the workpiece during the forming operation and is movable relative to at least one of the dies, whereby the separation step can be carried out by means of this relative motion.

2. The hot forming tool according to claim 1, wherein the workpiece holder is moveable relative to a first one of the dies, which until the separation essentially maintains its relative position with respect to the workpiece holder.

3. The hot forming tool according to claim 2, wherein the workpiece holder includes a first holding part located next to the first die and a second holding part located next to a second one of the dies, and both the first holding part and the second holding part are moveable relative to the first die and the second die over a dead center point of the dies in the closed state.

4. The hot forming tool according to claim 3, wherein a punching tool is disposed along the first die opposite the workpiece holder and is connected to the first holding part by a baseplate and moves with the first holding part.

5. The hot forming tool according to claim 3 wherein, a punching tool is disposed along the first die opposite the first holding part and moves relative to the first holding part and the first die.

6. The hot forming tool according to claim 2, wherein the first die is moveable relative to a second one of the dies over a dead center point of the workpiece holder with respect to the second die.

7. The hot forming tool according to claim 1, wherein the separation device includes at least one cutting element provided on the workpiece holder, and at least one cutting element provided on at least one of the dies for performing the separation on the workpiece.

8. The hot forming tool according to claim 7, wherein the cutting elements are fixed in position with respect to a shaping contour of their respective workpiece holder and die.

9. The hot forming tool according to claim 1, wherein the separating device has a punching tool which is connected to one of the dies and is moveable with the same.

10. The hot forming tool according to claim 1, wherein at least one of the die has a first molded part, as well as a second molded part, wherein the workpiece holder and the first molded part are moveable relative to the second molded part.

11. The hot forming tool according to claim 1, wherein the separating device has a punching tool.

12. The hot forming tool according to claim 1, wherein the separating device has at least one cutting element which contains a Cu—Zr alloy.

13. The hot forming tool according to claim 1, wherein the workpiece holder includes a first holding part and a second holding part for engaging and holding the workpiece between the first holding part and the second holding part during the forming operating.

14. The hot forming tool according to claim 13, wherein both the first holding part and the second holding part are movable relative to the dies while holding the workpiece between the first holding part and the second holding part.

15. The hot forming tool of claim 1, wherein the metal workpiece includes steel.

16. The hot forming tool of claim 1, wherein the separating device is disposed along one side of the dies and a punching tool is disposed on the opposite side of the dies, the dies include a shaping surface extending from the separating device to the punching tool, the shaping surface has a dimension designed to form the workpiece to a predetermined finished dimension, and the dimension of the shaping surface is greater than the predetermined finished dimension.

17. The hot forming tool of claim 1, wherein the workpiece holder includes a first holding part and a second holding part for holding the workpiece therebetween, each of the holding parts is a single block, and the separation device includes a cutting element integral with one of the holding parts.

18. A hot forming tool for hot forming a metal workpiece, comprising at least two dies which may be moved relative to one another for forming the workpiece, and having a cooling device by means of which the workpiece may be cooled in the hot forming tool from a first, higher temperature to a second, lower temperature, whereby the hot forming tool is provided with a separating device by means of which a separation can be carried out on a workpiece present in the hot forming tool before the workpiece reaches the second, lower temperature, wherein the separating device is provided by mutually associated cutting elements on the dies which perform a separating operation on the workpiece when the dies are brought together.

19. The hot forming tool according to claim 18, wherein a first one of the dies includes a workpiece holder which is moveable relative to a second one of the dies.

20. The hot forming tool according to claim 19, wherein the workpiece holder includes a first holding part located next to the first die and a second holding part located next to a second one of the dies, and both the first holding part and the second holding part are moveable relative to the first die and the second die over a dead center point of the dies in the closed state.

21. The hot forming tool according to claim 20, wherein a punching tool is disposed along the first die opposite the first holding part and is connected to the first holding part by a baseplate and moves with the first holding part.

22. The hot forming tool according to claim 20, wherein a punching tool is disposed along the first die opposite the first holding part and moves relative to the first holding part and the first die.

23. The hot forming tool according to claim 18, wherein a first one of the dies is moveable relative to a second one of the dies over a dead center point.

24. The hot forming tool according to claim 18, wherein at least one of the cutting elements is provided on each of the dies for together performing the separation on the workpiece.

25. The hot forming tool according to claim 18, wherein the separating device has a punching tool which is connected to one of the dies and is moveable with the same.

26. The hot forming tool according to claim 18, wherein the cutting elements are fixed in position with respect to a shaping contour of their respective dies.

27. The hot forming tool according to claim 18, wherein at least one of the dies has a first molded part, as well as a second molded, wherein the workpiece holder and the first molded part are moveable relative to the second molded part.

28. The hot forming tool according to claim 18, wherein the separating device has a punching tool.

29. The hot forming tool according to claim 18, wherein at least one of the cutting elements contains a Cu—Zr alloy.

30. The hot forming tool according to claim 18, wherein at least one of the dies includes a workpiece holder which holds the workpiece during the forming operation.

31. The hot forming tool according to claim 18 including a workpiece holder next to the dies, wherein the workpiece holder includes a first holding part and a second holding part for engaging and holding the workpiece between the first holding part and the second holding part during the forming operating.

32. The hot forming tool according to claim 31, wherein both the first holding part and the second holding part are movable relative to the dies while holding the workpiece between the first holding part and the second holding part.

33. The hot forming tool of claim 18, wherein the metal workpiece includes steel.

34. The hot forming tool of claim 18, wherein the separating device is disposed along one side of the dies and a punching tool is disposed on the opposite side of the dies, the dies include a shaping surface extending from the separating device to the punching tool, the shaping surface has a dimension designed to form the workpiece to a predetermined finished dimension, and the dimension of the shaping surface is greater than the predetermined finished dimension.

35. The hot forming tool of claim 18, wherein a first one of the dies is integral with a workpiece holder, and one of the cutting elements is integral with the first die.

\* \* \* \* \*